No. 731,831. PATENTED JUNE 23, 1903.
C. P. H. AHRLE.
BRONZE COATED PLATE.
APPLICATION FILED MAR. 11, 1902.
NO MODEL.

Witnesses.

Inventor.
C. P. H. Ahrle.
by Wilkinson & Fisher
Attorneys.

No. 731,831. Patented June 23, 1903.

UNITED STATES PATENT OFFICE.

CARL PETER HERMANN AHRLE, OF FRANKFORT-ON-THE-MAIN, GERMANY, ASSIGNOR TO THE FIRM OF METALLINE-PLATTEN-GESELLSCHAFT M. B. H., OF FRANKFORT-ON-THE-MAIN, GERMANY.

BRONZE-COATED PLATE.

SPECIFICATION forming part of Letters Patent No. 731,831, dated June 23, 1903.

Application filed March 11, 1902. Serial No. 97,788. (No model.)

*To all whom it may concern:*

Be it known that I, CARL PETER HERMANN AHRLE, a subject of the King of Prussia, German Emperor, residing at 32 Sandweg, Frankfort-on-the-Main, in the Kingdom of Prussia, Germany, (post-office address, 32 Sandweg, Frankfort-on-the-Main, Prussia, Germany,) have invented certain new and useful Improvements in Bronze-Coated Plates; and I do hereby declare the following to be a full, clear, and exact description of the invention, such as will enable others skilled in the art to which it appertains to make and use the same.

My invention relates to bronze-coated plates for use in photographic, photomechanical, and other printing processes.

Figure 1:
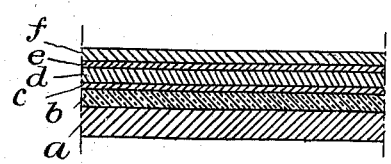
Figure 2:
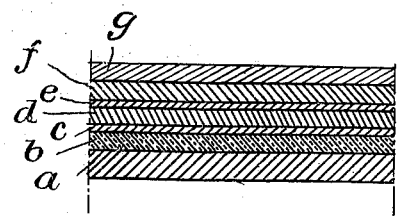

In the accompanying drawings, Figure 1 is a cross-section, on an enlarged scale, of a portion of a bronze-coated plate prepared for photomechanical and other printings. Fig. 2 is a similar sectional view of a bronze-coated plate prepared and sensitized for use in photography.

$a$ represents the base, which is of some rigid material and of such slight flexibility as not to injure the durability and homogeneousness of the coating. $b$ represents a layer of varnish, preferably japan, which is applied to said base.

$c$ represents a layer formed by pouring a solution composed of the following parts, by weight, according to United States of America Patent No. 694,227—viz., sixteen of albumen, nine of honey, and twenty-three of water—over the varnish.

$d$ represents a layer of bronze-powder. This powder is applied to the layer of japan varnish after the layer $c$, composed of albumen, honey, and water, has been poured over the varnish and while the surface is still moist. The bronze-powder is applied to the moist surface by means of a fine brush. After the bronze layer has been applied a liquid, preferably alcohol, is poured over the bronze layer and by its evaporation leaves the surface of the layer very hard. In the drawings $e$ represents the hardened surface of the bronze layer.

$f$ represents the gelatin layer poured over the bronze coating. This completes the plate as shown in Fig. 1, which plate may be used for receiving prints.

$g$ in Fig. 2 represents a layer of sensitive emulsion which is placed on the layer of gelatin, rendering the plate shown in Fig. 2 suitable for photographic purposes.

The gelatin layer $f$ is prepared as follows: Pure gelatin is warmed and a hardening agent is added thereto, such as formaline—that is, a solution containing about forty per cent. of formaldehyde or chrome-alum or bichromate of potassium or any other suitable agent. One of these mixtures in then poured over the plates which are set up vertically and preferably dried by sunlight.

Bronze-coated plates thus prepared and as shown in Fig. 1 are ready for use in all photomechanical and other printing processes. Plates prepared as shown in Fig. 2 are ready for photographic work.

Having thus described my invention, what I claim as new, and desire to secure by Letters Patent, is—

1. The herein-described bronze-coated plate consisting of a rigid base, a layer of varnish applied thereto, a binding solution, a metallic coating applied above said solution, said metallic coating having a hardened surface, and a hardened-gelatin layer above said coating, substantially as described.

2. The herein-described bronze-coated plate consisting of a rigid base, a layer of varnish applied thereto, a binding solution, a metallic coating hardened with alcohol applied to said binding solution, a layer of hardened gelatin, and a layer of sensitized emulsion, substantially as described.

In testimony whereof I affix my signature in presence of two witnesses.

CARL PETER HERMANN AHRLE.

Witnesses:
 JEAN GRUND,
 CARL GRUND.